(12) United States Patent
Suh et al.

(10) Patent No.: US 7,142,364 B2
(45) Date of Patent: Nov. 28, 2006

(54) GUIDED RESONANCE DIELECTRIC FILTER SYSTEMS

(75) Inventors: Wonjoo Suh, Stanford, CA (US); Olav Solgaard, Stanford, CA (US); Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 88 days.

(21) Appl. No.: 10/936,837

(22) Filed: Sep. 8, 2004

(65) Prior Publication Data

US 2006/0050394 A1    Mar. 9, 2006

(51) Int. Cl.
*G02B 1/10* (2006.01)

(52) U.S. Cl. .................. 359/587; 359/589; 359/577; 385/27

(58) Field of Classification Search .............. 359/587, 359/589, 577, 590; 385/27, 39
See application file for complete search history.

(56) References Cited

U.S. PATENT DOCUMENTS

| 6,130,969 | A  | * | 10/2000 | Villeneuve et al. ........... 385/27 |
| 6,711,200 | B1 | * | 3/2004  | Scherer et al. ................ 372/64 |
| 6,944,384 | B1 | * | 9/2005  | Loncar et al. ............... 385/129 |
| 2005/0053321 | A1 | * | 3/2005 | Lidorikis et al. ............. 385/15 |

OTHER PUBLICATIONS

S. Fan et al., "Analysis of Guided Resonances in Photonic Crystal Slabs", *Physical Review B*, vol. 65, 235112, 2002, 8 pages.

S. Fan et al., "Channel Drop Tunneling through Localized States", *Physical Review Letters*, vol. 80, No. 5, Feb. 2, 1998, pp. 960-963.

S. Fan et al., "Temporal Coupled-Mode Theory for the Fano Resonance in Optical Resonators", *J. Opt. Soc. Am. A*, vol. 20, No. 3, Mar. 2003, pp. 569-572.

F. Gires et al., C. R. Hebd. Seances Acad. Sci. B Sci, Phys. (France) 268, Jan. 27, 1969, pp. 313-316 (no translation).

D. K. Jacob et al., "Flat-top Narrow-Band Spectral Response Obtained from Cascaded Resonant Grating Reflection Filters", *Applied Optics*, vol. 41, No. 7, Mar. 1, 2002, pp. 1241-1245.

M. Kanskar et al., Observation of Leaky Slab Modes in an Air-Bridged Semiconductor Waveguide with a Two-Dimensional Photonic Lattice, *Appl. Phys. Lett.*, vol. 70, No. 11, Mar. 17, 1997, pp. 1438-1440.

G. Lenz et al., "General Optical All-Pass Filter Structures for Dispersion Control in WDM Systems", *Journal of Lightwave Technology*, vol. 17, No. 7, Jul. 1999, pp. 1248-1254.

(Continued)

*Primary Examiner*—Fayez G. Assaf
(74) *Attorney, Agent, or Firm*—Parsons Hsue & de Runtz LLP

(57) ABSTRACT

We theoretically introduce a new type of optical all-pass filter based on guided resonance in coupled photonic crystal slabs. The filter exhibits near-complete transmission for both on- and off-resonant frequencies and yet generates large resonant group delay. We further show that such a filter can be mechanically switched into a flat-top band rejection filter. We also show that a single photonic crystal slab can also function either as optical all-pass transmission or flattop reflection filter for normally incident light. Both filter functions are synthesized by designing the spectral properties of guided resonance in the slab. The structure is extremely compact along the vertical direction.

34 Claims, 6 Drawing Sheets

OTHER PUBLICATIONS

C. K. Madsen et al., "A Tunable Dispersion Compensating MEMS All-Pass Filter", *IEEE Photonics Technology Letters*, vol. 12, No. 6, Jun. 2000, pp. 651-653.

R. Magnusson et al., "New Principle for Optical Filters", *Appl. Phys. Lett.*, vol. 61, No. 9, Aug. 31, 1992, pp. 1022-1024.

W. Suh et al., "All-Pass Transmission or Flattop Reflection Filters Using a Single Photonic Crystal Slab", *Applied Physics Letters*, vol. 84, No. 24, Jun. 14, 2004, pp. 4905-4907.

W. Suh et al., "Displacement-Sensitive Photonic Crystal Structures Based on Guided Resonance in Photonic Crystal Slabs", *Applied Physics Letters*, vol. 82, No. 13, Mar. 31, 2003, pp. 1999-2001.

W. Suh et al., "Mechanically Switchable Photonic Crystal Filter with Either All-Pass Transmission or Flat-Top Reflection Characteristics", *Optics Letters*, vol. 28, No. 19, Oct. 1, 2003, pp. 1763-1765.

S. S. Wang et al., "Design of Waveguide-Grating Filters with Symmetrical Line Shapes and Low Sidebands", *Optics Letters*, vol. 19, No. 12, Jun. 15, 1994, pp. 919-921.

Z. Wang et al., "Compact All-Pass Filters in Photonic Crystals as the Building Block for High-Capacity Optical Delay Lines", *Physical Review E*, vol. 68, 066616, 2003, 4 pages.

Y. Xu et al., "Scattering-Theory Analysis of Waveguide-Resonator Coupling", *Physical Review E*, vol. 62, No. 5, Nov. 2000, pp. 7389-7404.

\* cited by examiner

The open circles are the numerical results from a FDTD simulation.
The solid curve is from analytical theory.

GUIDED RESONANCE DIELECTRIC FILTER SYSTEMS

This invention was made with support by the U.S. Army Research Laboratories under contract DAAD17-02-C-0101 and by National Science Foundation (NSF) grant ECS-0200445. grant number NSF 0200445. The United States Government has rights in this invention.

FIELD OF THE INVENTION

This invention relates in general to optical systems, and in particular, to dielectric filters with guided resonance characteristics, that can be advantageously in applications such as all pass or flat top filters.

BACKGROUND OF THE INVENTION

Optical filters play important roles in communication systems. In particular, a narrowband flat-top reflection filter, which reflects a particular wavelength channel while letting other channels pass through, is needed to achieve the wavelength sensitivity in wavelength-division multiplexing systems. See D. K. Jacob, S. C. Dunn, and M. G. Moharam, Appl. Opt. 41, 1241 (2002). On the other hand, an all-pass transmission filter, which generates significant delay at resonance, while maintaining 100% transmission both on and off resonance, is useful for applications such as optical delay or dispersion compensation. See C. K. Madsen, J. A. Walker, J. E. Ford, K. W. Goossen, T. N. Nielsen, and G. Lenz, IEEE Photon. Technol. Lett. 12, 651 (2000). See G. Lenz and C. K. Madsen, J. Lightwave Technol. 17, 1248 (1999); and C. K. Madsen, J. A. Walker, J. E. Ford, K. W. Goossen, T. N. Nielsen, and G. Lenz, IEEE Photonics Technol. Lett. 12, 651 (2000).

SUMMARY OF THE INVENTION

This invention is based on the recognition that interaction of different guided resonance modes in a dielectric structure with periodic refractive index contrast therein can provide the all-pass or flat-top filter characteristics. Where at least two guided resonance modes in the dielectric structure have substantially the same frequency and width but different symmetries, the filter exhibits substantially all-pass transmission characteristics over a bandwidth and introduces a delay of frequency components at or near a resonance frequency of the structure relative to other frequency components in the bandwidth. Where the at least two guided resonance modes have substantially the same frequency, width and symmetry, the filter exhibits substantially flat top reflection characteristics at or near resonance frequencies of the structure over a bandwidth. The periodic contrast can be one-dimensional or two-dimensional. By cascading all-pass filters, it is possible to construct a delay line, or a filter with the desired delay characteristics for delaying selected wavelength components.

The at least two guided resonance modes can exist in a single integral body, such as a photonic crystal or grating, or they can exist in separate bodies. Where they exist in separate bodies, the filter characteristics can be altered or tuned by mechanical means, such as by changing the distance between the bodies by mechanical means, such as a motor.

BRIEF DESCRITION OF THE DRAWINGS

FIG. 1 is a schematic view of a mechanically tunable photonic crystal filter comprising two photonic crystal slabs to illustrate an embodiment of the invention. The arrow represents the direction of the incident light. The spectral response function of the filter is tunable by varying the distances between the two slabs.

FIG. 2 is a graphical plot of the transmission spectrum through a single photonic crystal slab for normally incident light. The crystal structure shown in the inset comprises of a square lattice of air holes of radius 0.1 a, where a is the lattice constant. The slab has a dielectric constant of 11.4 and a thickness of 1.05 a. The open circles are the numerical results from a FDTD simulation. The solid curve is from the analytical theory in S. Fan, W. Suh, and J. D. Joannopoulos, J. Opt. Soc. Am. A 20, 569 (2003).

FIGS. 3(a)–3(c) are graphical plots of the Spectral response functions for the two-slab structure shown in FIG. 1, with an edge-to-edge distance of 0.4 a. FIG. 3(a) illustrates the resonance amplitudes of the even mode (dashed curve) and the odd mode (solid curve), FIG. 3 (b) illustrates the transmission spectrum for normally incident light, FIG. 3 (c) illustrates the group delay. In both FIGS. 3 (b) and 3(c), the solid curve represents the theory and the open circles correspond to FDTD simulations.

FIGS. 4(a) and 4(b) are graphical plots of the transmission spectra through the two-slab structure shown in FIG. 1 as we vary the distance between the slabs to be 0.5 a in FIG. 4(a) and 1.1 a in FIG. 4(b). The solid curves represent the theory, and the open circles correspond to FDTD simulations.

FIG. 5(a) is a schematic view of a photonic crystal filter comprising a single photonic crystal slab to illustrate an alternative embodiment of the invention. The arrow represents the direction of the incident light. The radius of air holes is 0.12 a, and the thickness is 2.05 a, where a is the lattice constant.

FIG. 5(b) is a schematic view of a theoretical model for a resonator system that supports two resonant states with opposite symmetry with respect to the mirror plane perpendicular to the incident light.

FIGS. 6(a)–6(c) illustrate spectral response functions for the one slab structure shown in FIG. 5(a) with a dielectric constant of 10.07. FIG. 6(a) is a graphical plot of the spectra of resonance amplitudes for the even mode (dashed line) and the odd mode (solid line). FIG. 6(b) is a graphical plot of the transmission spectrum for normally incident light. FIG. 6(c) is a graphical plot of the Group delay spectrum. In both FIGS. 6(b) and 6(c), the solid line represents the theory and the open circles correspond to FDTD simulations.

Figure 10A:
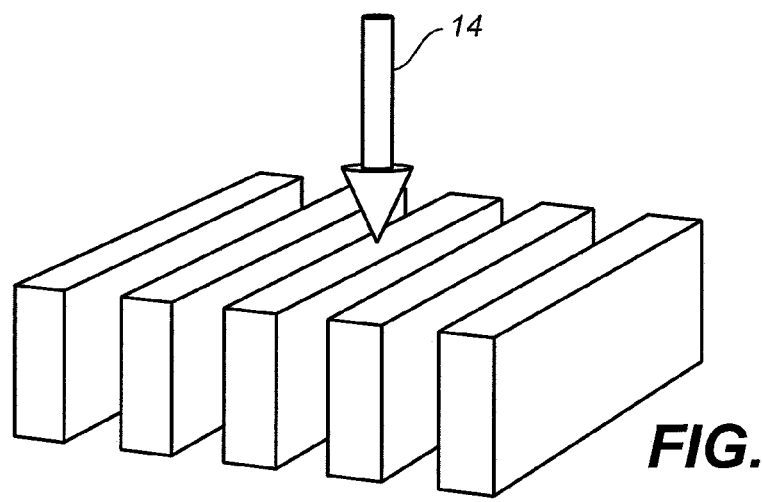
Figure 10B:
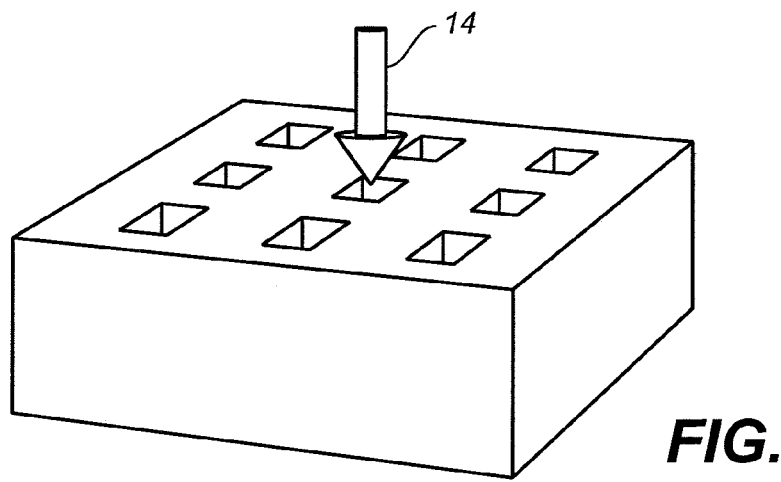

FIGS. 10(a) and 10(b) are schematic views of a one and two-dimensional gratings respectively to illustrate additional alternative embodiments of the invention.

For simplicity in description, identical components are labeled by the same numerals in this application.

DETAILED DESCRIPTION OF THE EMBODIMENTS

Figure 1:
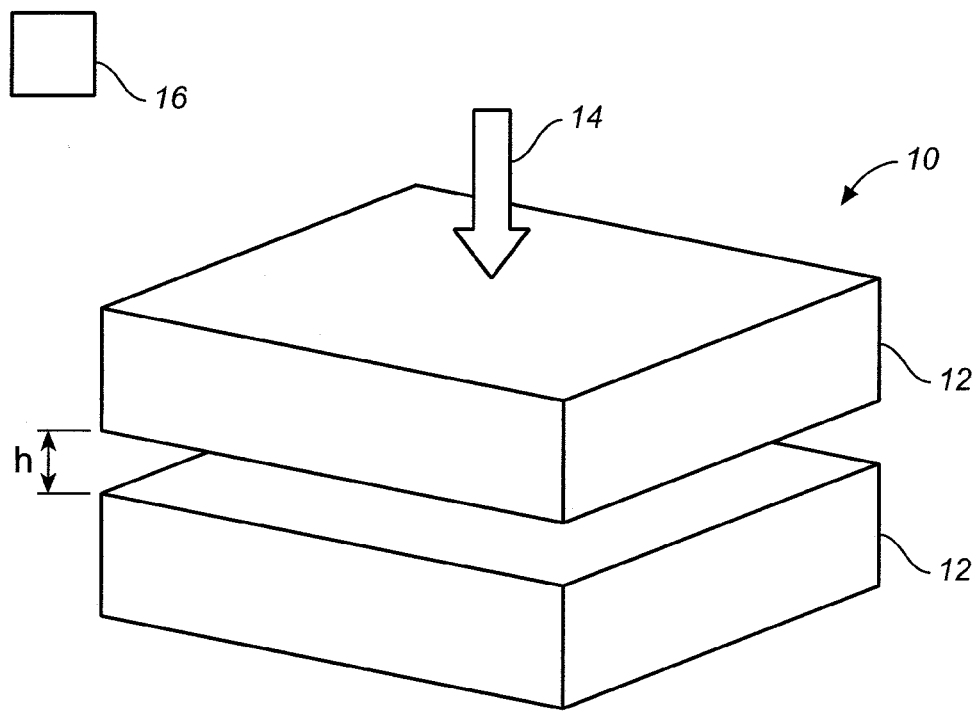

We introduce a mechanically switch-able photonic crystal filter structure that can function as either a flat-top reflection filter or an all-pass transmission filter. In one embodiment, the structure 10, shown in FIG. 1, comprises two photonic crystal slabs 12. FIG. 1 is a schematic view of a mechanically tunable photonic crystal filter comprising two photonic crystal slabs 12 to illustrate an embodiment of the invention. The arrow 14 represents the direction of the incident light (and the light beam itself). The spectral response function of the filter 10 is tunable by varying the distances between the two slabs. Each slab is constructed by introduction of a periodic array of air holes into a high-index guiding layer. We show that for normally incident light one can switch the transmission characteristic of the structure by simply varying the distance h between the slabs. Furthermore, unlike all previously reported all-pass reflection filters based on Gires-Tournois interferometers (See F. Gires and P. Tournois, C. R. Hebd. Seances Acad. Sci. B Sci. Phys. (France) 268, 313 (1969), which use multiple dielectric stacks, our structure generates an all-pass transmission spectrum, which significantly simplifies signal extraction and optical alignment. In addition, where the beam 14 of radiation is incident along a direction about which the slabs 12 are symmetrical (i.e. air hole arrays therein rotationally symmetrical with respect to the beam 14 direction), the slabs are rotationally symmetrical about the direction, and the spectral response of device or structure 10 is polarization independent because of the 90° rotational symmetry of the structure. In some implementations of this embodiment, beam 14 is incident in a direction normal to the surface of slabs 12.

Figure 2:
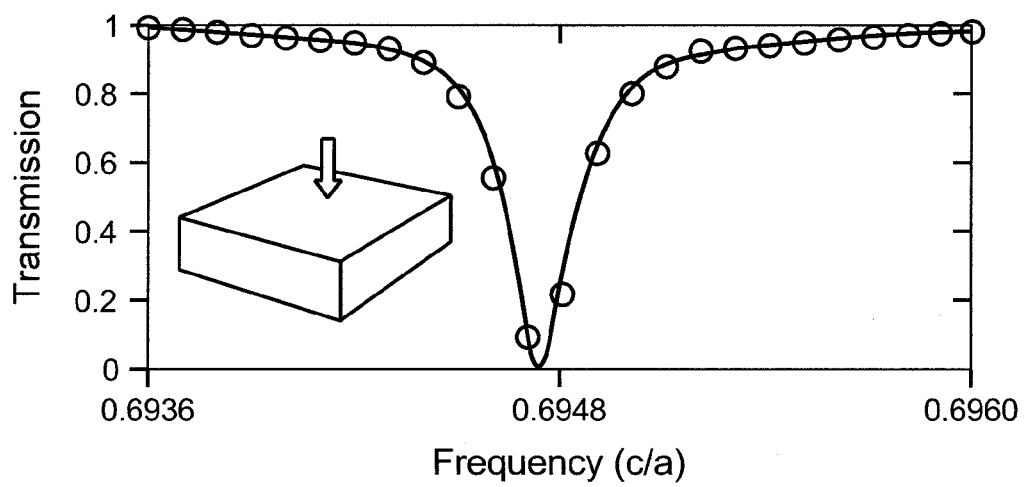

FIG. 2 is a graphical plot of the transmission spectrum through a single photonic crystal slab such as slab 12 of FIG. 1 for normally incident light. The crystal structure shown in the inset comprises a square lattice of air holes of radius 0.1 a, where a is the lattice constant. The slab has a dielectric constant of 11.4 and a thickness of 1.05 a. The open circles are the numerical results from a FDTD simulation. The solid curve is from the analytical theory in S. Fan, W. Suh, and J. D. Joannopoulos, J. Opt. Soc. Am. A 20, 569 (2003).

The filter function of device 10 relies on the guided resonance phenomenon in each photonic crystal slab. Guided resonance is a class of optical mode that is strongly confined by the dielectric slab and yet can couple into radiation modes because of the phase-matching mechanism provided by the periodic index contrast. See M. Kanskar, P. Paddon, V. Pacradouni, R. Morin, A. Busch, J. F. Young, S. R. Johnson, J. Mackenzie, and T. Tiedje, Appl. Phys. Lett. 70, 1438 (1997); and S. Fan and J. D. Joannopoulos, Phys. Rev. B 65, 235112 (2002). As light is normally incident upon the slab, the wave can pass through the slab either directly or indirectly by first exciting the resonance and then decaying out. In the particular case where the partial transmission coefficient through the direct pathway is unity, the reflection from the crystal exhibits a Lorentzian line shape with 100% reflectivity at the resonant frequency (See R. Magnusson and S. S. Wang, Appl. Phys. Lett. 61, 1022 (1992), as can be seen in FIG. 2 for the transmission through a single slab (See S. Fan, W. Suh, and J. D. Joannopoulos, J. Opt. Soc. Am. A 20, 569 (2003), with a dielectric constant of 11.4 [which is appropriate for GaAs at 1.55 μm (See E. D. Palik, Handbook of Optical Constants of Solids (Academic, San Diego, Calif., 1985), p. 439.), a thickness of 1.05 a and a radius of 0.1 a for the air holes (a is the lattice constant).

Having two slabs creates additional flexibility with which to engineer spectral functions. See W. Suh, M. F. Yanik, O. Solgaard, and S. Fan, Appl. Phys. Lett. 82, 1999 (2003). First an all-pass transmission filter for optical delay applications will be considered. A single resonance can generate significant optical delay. However, in the single-slab geometry with only one resonant mode shown in FIG. 2, since the reflected amplitude comes entirely from the resonant decay, there is a strong variation of the transmitted intensity as a function of frequency.

To achieve an all-pass characteristic with no intensity variation over the resonance bandwidth, it is therefore necessary to use at least two resonances. For simplicity, we consider a system with two substantially identical slabs 12, as shown in FIG. 1. Each slab supports a single resonance within the bandwidth of interest. Since there is mirror symmetry parallel to the slab, the resonant modes of the coupled system can be decomposed into either even or odd modes with respect to the mirror plane. When external light (e.g. beam 14) is incident upon the slabs, both the even and odd modes are excited. The power in each resonance then decays in both forward and backward directions. Since the two modes have different symmetry, the decaying amplitudes in the backward direction acquire an opposite phase and interfere destructively. Therefore, complete transmission over the bandwidth of interest becomes possible, provided that the even and odd modes possess the same resonant frequency and the same width. See S. Fan, P. R. Villeneuve, J. D. Joannopoulos, and H. A. Haus, Phys. Rev. Lett. 80, 960 (1998). To achieve complete transmission we place two slabs close to each other so that the modes in the two slabs can couple through an evanescent tunneling pathway, in addition to the free-space propagation of light between the slabs.

The idea described above can be quantified by use of the coupling of modes in a time-dependent formalism for optical resonators. See S. Fan, W. Suh, and J. D. Joannopoulos, J. Opt. Soc. Am. A 20, 569 (2003); and H. A. Haus, Waves and Fields in Optoelectronics (Prentice-Hall, Englewood Cuffs, N.J., 1984). The theoretical model describes the dynamics of the optical resonance amplitudes a and b in the two slabs. For the structure in FIG. 2, which possesses a Lorentzian resonance, the dynamic equation for the amplitude a in the first slab is $$\frac{da}{dt}\left(j\omega_0 - \frac{1}{\tau}\right)a + j\sqrt{\frac{1}{\tau}}S_{1+} + j\sqrt{\frac{1}{\tau}}S_{2+} + j\text{K}b, \quad (1)$$

$$S_{1-} = S_{2+} + j\sqrt{\frac{1}{\tau}}a, \; S_{2-} = S_{1+} + j\sqrt{\frac{1}{\tau}}a, \quad (2)$$

where $\omega_0$ is the resonance frequency and $\tau$ is the resonance lifetime. $S_{1+}$, $S_{2+}$, $S_{1-}$, and $S_{2-}$ are incoming and outgoing waves from either side of the first slab. The coupling constant $\kappa$ describes the strength of evanescent tunneling between the two slabs and is real because of energy conservation and mirror symmetry constraints. Similarly, the equations for the amplitude b in the second slab can be written as $$\frac{db}{dt}\left(j\omega_0 - \frac{1}{\tau}\right)b + j\sqrt{\frac{1}{\tau}}P_{1+} + j\sqrt{\frac{1}{\tau}}P_{2+} + j\text{K}a, \quad (3)$$

$$P_{1-} = P_{2+} + j\sqrt{\frac{1}{\tau}}b, \; P_{2-} = P_{1+} + j\sqrt{\frac{1}{\tau}}b, \quad (4)$$

where $P_{1+}$, $P_{2+}$, $P_{1-}$, and $P_{2-}$ and are incoming and outgoing waves from either side of the second slab. Also, since the wave can propagate between the slabs, we have $$P_{1+} = \exp(-j\phi)S_{2-}, \quad P_{1-} = \exp(j\phi)S_{2+}, \quad (5)$$

where $\phi = (\omega/c)h$ and h is the distance between the edges of the slabs. Using Eqs. (1)–(5), we can eliminate wave amplitudes that are propagating between the slabs to arrive at the dynamic equations for the even resonance, A (=a+b), and the odd resonance, B (=a−b). Then, when the coupling coefficient is set to be $\kappa = -j \exp(-j\phi)/\tau$ and when $\phi = \pi/2$ is chosen, the even and odd resonances will possess the same resonance frequency and decay length. Under these circumstances, the transmission coefficient becomes $$t = \exp(-j\phi) \frac{j(\omega - \omega_0) - 1/\tau}{j(\omega - \omega_0) + 1/\tau}, \quad (6)$$

and, indeed, the structure behaves as an all-pass filter.

As a physical realization of the theoretical analysis, we consider the two-slab structure, each slab of which has a resonance frequency at 0.694 (c/a) as shown in FIG. 2. In a FDTD simulation (See S. Fan and J. D. Joannopoulos, Phys. Rev. B 65, 235112 (2002); K S. Kunz and R. J. Luebbers, The Finite-Difference Time-Domain Methods for Electromagnetics (CRC, Boca Raton, Fla., 1993); and A. Taflove and S. Hagness, Computational Electrodynamics: The Finite-Difference Time-Domain Methods (Artech House, Boston, Mass., 2000), the line shapes of the even and odd modes can be obtained by Fourier transformation of the temporal decay of the resonance amplitude.

Figure 3A:
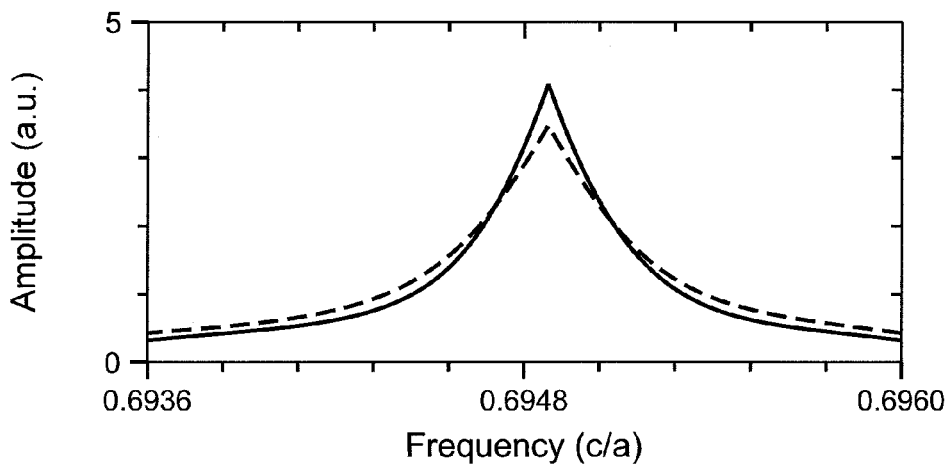
Figure 3B:
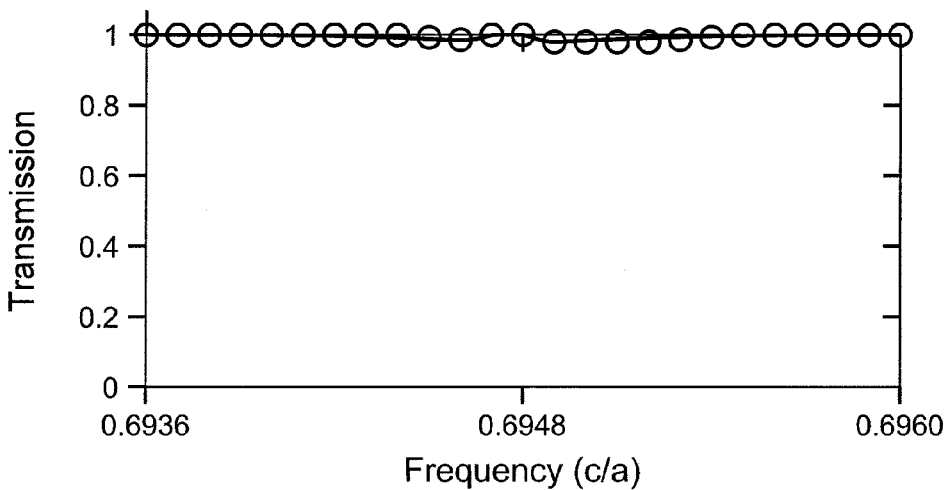
Figure 3C:
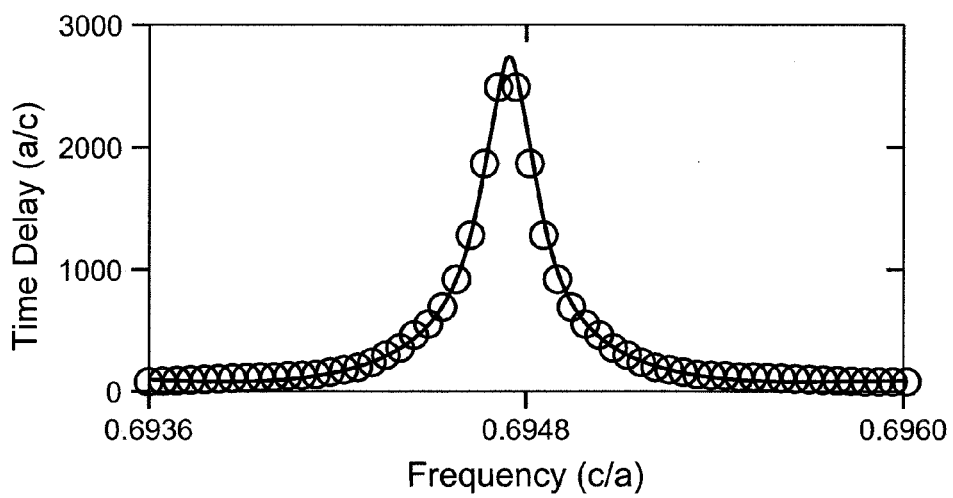

FIGS. 3(a)–3(c) are graphical plots of the Spectral response functions for the two-slab structure shown in FIG. 1, with an edge-to-edge distance of 0.4 a. FIG. 3(a) illustrates the resonance amplitudes of the even mode (dashed curve) and the odd mode (solid curve), FIG. 3 (b) illustrates the transmission spectrum for normally incident light, FIG. 3 (c) illustrates the group delay. In both FIGS. 3 (b) and 3(c), the solid curve represents the theory and the open circles correspond to FDTD simulations. When the displacement between the slabs is chosen to be 0.4 a, the resonant line shapes of the even and odd modes overlap almost completely as shown in FIG. 3(a). For such a structure, the transmission spectrum indeed shows near 100% transmission over the entire bandwidth of structure 10 both on and off resonance as shown in FIG. 3(b), and yet a large resonant delay is generated in the vicinity of the resonant frequency as shown in FIG. 3(c). To compare the simulation with the theory, we extract the parameter from FIG. 3(a), and generate the theoretical spectra by use of Eqs. (1)–(5). The simulations show excellent agreement with the analytic theory.

Figure 4A:
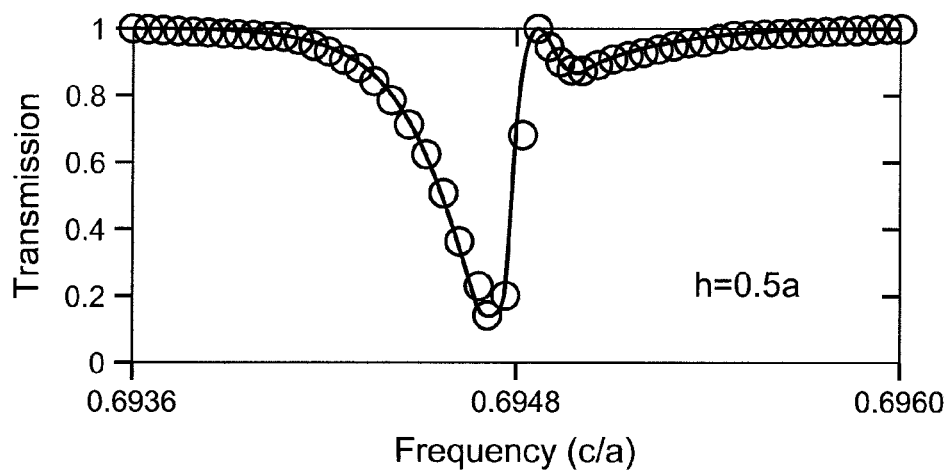
Figure 4B:
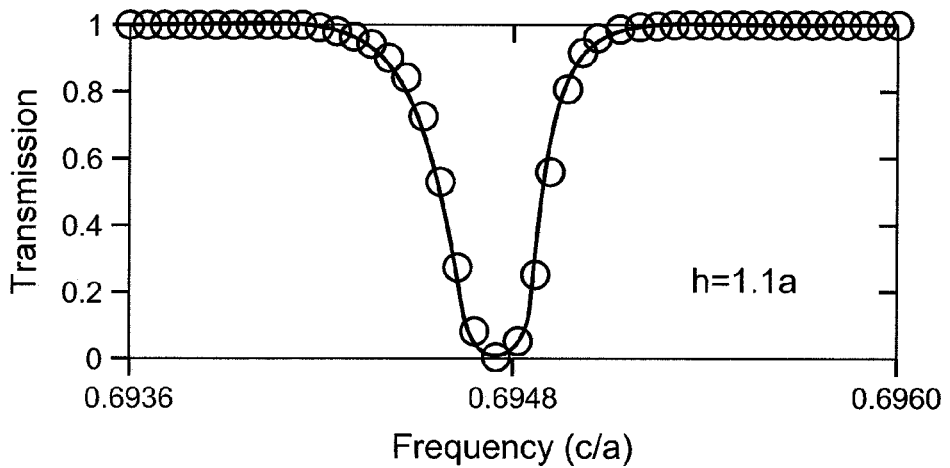

The spectral response function of the two-slab structure can be tuned by mechanical variation of the distance between the slabs 12, such as by means of a motor 16 in FIG. 1 (connections of motor 16 to slabs not shown). FIGS. 4(a) and 4(b) are graphical plots of the transmission spectra through the two-slab structure shown in FIG. 1 as we vary the distance between the slabs to be 0.5 a in FIG. 4(a) and 1.1 a in FIG. 4(b). The solid curves represent the theory, and the open circles correspond to FDTD simulations. As we increase the distance h between the slabs, the evanescent coupling becomes negligible, and it is no longer possible to generate all-pass transmission. Rather, significant reflection occurs in the vicinity of the resonance as shown in FIG. 4(a).

In particular, by choosing h=1.1 a, one could generate a flat-top reflection spectrum, as demonstrated by FDTD simulations in FIG. 4(b). Therefore, by choosing a large enough value for h, the two slabs are placed apart from each other so that the at least two modes are not substantially coupled to each other in near field. Thus, with mechanical tuning, such as by means of motor 16, a guided resonance device can generate two types of filter response that are useful for optical communication systems. In addition, the flat spatial dispersion of the guided resonance may permit operation of such filters with a large range of operation angles.

In the above described embodiment, it is shown that by coupling two photonic slabs together, all-pass transmission or flattop reflection could be synthesized. In an alternative embodiment, we show that a single photonic crystal slab can function either as an all-pass transmission filter or as a flattop reflection filter, thus providing an extremely compact way of generating useful filter functions, and further demonstrating the versatility of photonic crystal structures.

Figure 5A:
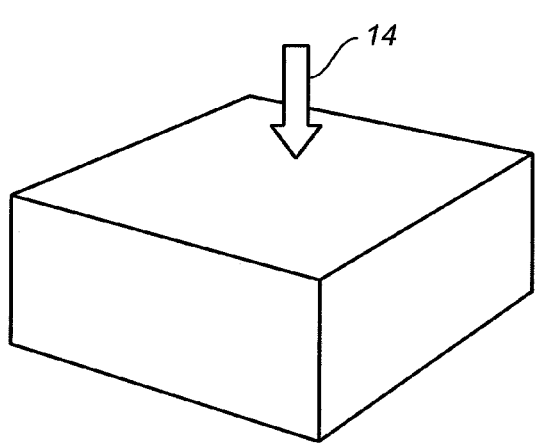

To generate either an all-pass transmission or narrowband reflection filter functions, one will need to have two resonant modes in the vicinity of the signal frequencies, which possess opposite symmetry with respect to the mirror plane perpendicular to the propagating direction. See W. Suh and S. Fan, Opt. Lett. 28, 1763 (2003). FIG. 5(a) is a schematic view of a photonic crystal filter comprising a single photonic crystal slab to illustrate an alternative embodiment of the invention. The arrow represents the direction of the incident light. The radius of air holes is 0.12 a, and the thickness is 2.05 a, where a is the lattice constant. In the photonic crystal slab as shown in FIG. 5(a), the resonant modes required are provided by the guided resonances. A guided resonance originates from the guided modes in a uniform dielectric slab, and is therefore strongly confined within the slab. And yet the periodic index contrast provides the phase matching mechanisms that allow these modes to couple into free space radiations in the vertical direction. Since a dielectric slab structure supports TE or TM guided modes that are even or odd with respect to the mirror plane at the center of the slab, a guided resonance could also be designed to have either even or odd symmetry. By appropriately choosing the structural parameters, it is then possible to place both an even resonance and an odd resonance in the vicinity of the signal frequency.

Figure 5B:
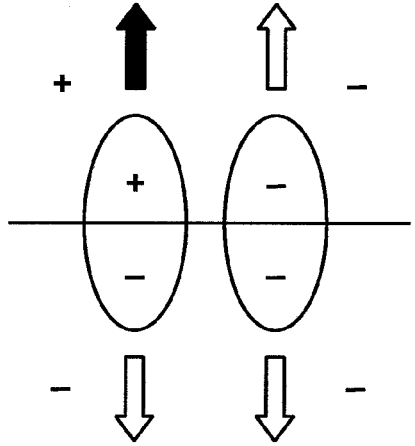

The transmission properties of a photonic crystal slab for externally incident light are determined by a Fano interference between a direct and an indirect transmission pathway. See S. Fan, W. Suh, and J. D. Joannopoulos, J. Opt. Soc. Am. A 20, 569 (2003). In a direct pathway, the incident light passes through the slab without exciting the guided resonance. In an indirect pathway, the incident light first excites the guided resonance. The power in the resonance then slowly decays into the free space. For a structure with two resonances, such interference effects can be described by a theoretical model, schematically shown in FIG. 5(b). FIG. 5(b) is a schematic view of a theoretical model for a resonator system that supports two resonant states with opposite symmetry with respect to the mirror plane perpendicular to the incident light. This model is based upon coupling of modes in a time-dependent formalism for optical resonators, which is generally valid when the quality factor of the resonance is high. See H. A. Haus, *Waves and Fields* in *Optoelectronics* (Prentice-Hall, Engle-wood Cliffs, N.J., 1984):

$$\frac{da_{even}}{dt} = (j\omega_{even} - \gamma_{even})a_{even} + j\sqrt{\gamma_{evenS1+}} + j\sqrt{\gamma_{evenS2+}}, \quad (7)$$

$$\frac{da_{odd}}{dt} = (j\omega_{odd} - \gamma_{odd})a_{odd} + j\sqrt{\gamma_{oddS1+}} - j\sqrt{\gamma_{oddS2+}}, \quad (8)$$

$$S_{1-} = S_{2+} + j\sqrt{\gamma_{even}a_{even}} + j\sqrt{\gamma_{odd}a_{odd}}, \quad (9)$$

$$S_{2-} = S_{1+} + j\sqrt{\gamma_{even}a_{even}} - j\sqrt{\gamma_{odd}a_{odd}}, \quad (10)$$

Here $\alpha_{even}$ and $\alpha_{odd}$ are the amplitudes in the even and odd resonances, respectively. $\omega_{even}$ and $\omega_{odd}$ represent their frequencies, and $\gamma_{even}$ and $\gamma_{odd}$ are their decay rates. The outgoing wave amplitude, $s_{1-}$ or $s_{2-}$, each consists of a sum of a direct term that is equal to the incoming wave amplitude, $s_{1+}$ or $s_{2+}$, and two indirect terms that are proportional to the amplitudes of even and odd resonances $\alpha_{even}$ and $\alpha_{odd}$. The indirect terms describe the decay of the resonances [Eqs. (9) and (10)]. In the direct terms, we assume that the partial transmission coefficient through the slab is unity. This is important for creating both all-pass transmission and flattop reflection filter characteristics, and can be accomplished by choosing an appropriate optical thickness of the slab. See S. S. Wang and R. Magnusson, Opt. Lett. 19, 919 (1994). We note that the indirect terms from $\alpha_{even}$ and $\alpha_{odd}$ are of opposite signs due to the different symmetry properties of the modes. Using this model, the transmission coefficient through the slab can be calculated as $$t = 1 - \frac{\gamma_{even}}{(j\omega - j\omega_{even} + \gamma_{even})} - \frac{\gamma_{odd}}{(j\omega - j\omega_{odd} + \gamma_{odd})} \quad (11)$$

When the condition of an accidental degeneracy is satisfied, ie—, $\gamma_{even}=\gamma_{odd}=\gamma$, $\omega_{even}=\omega_{odd}=\omega_o$, the transmission coefficient becomes $$t = \frac{j(\omega - \omega_o) - \gamma}{j(\omega - \omega_o) + \gamma}, \quad (12)$$

and the structure behaves as an all-pass filter. The amplitudes of the transmission are unity both on and off resonance, while the phase goes through a very rapid change from 0 to $2\pi$ in the vicinity of the resonance, and thus gives rise to a strong resonant delay. On the other hand, when $\gamma_{even}=\gamma_{odd}=\gamma$, $|\omega_{even}-\omega_{odd}|=2\gamma$ transmission becomes $$|t|^2 = \frac{(\omega - \omega_o)_4}{(\omega - \omega_o)_4 + 4\gamma_4}, \quad (13)$$

where $\omega_o=(\omega_{even}+\omega_{odd})/2$. The structure shows flat-top reflection characteristics, with a narrow range of frequency in the vicinity of $\omega_o$ completely reflected, while all other frequencies are passing through. Therefore, depending on the choice of $\gamma_{even}$, $\omega_{odd}$, $\gamma_{even}$, and $\gamma_{odd}$, the transmission coefficient in Eq. (11) exhibits either all-pass transmission or flattop reflection filter characteristics.

Both filter characteristics can be physically realized in the single slab structure as shown in FIG. 5(a). In a finite-difference time-domain (FDTD) simulation (See K. S. Kunz and R. J. Luebbers, *The Finite-difference Time-Domain Methods for Electromagnetics* (CRC Press, Boca Raton, Fla., 1993); A. Taflove and S. Hagness, *Computational Electrodynamics: The Finite-Difference rime-Domain Methods* (Artech House, Boston, 2000), we excite the resonant modes by a pulse of a normally incident plane wave. The line shapes of even and odd modes can then be obtained by Fourier-transforming the temporal decay of the resonance amplitudes.

Figure 6A:
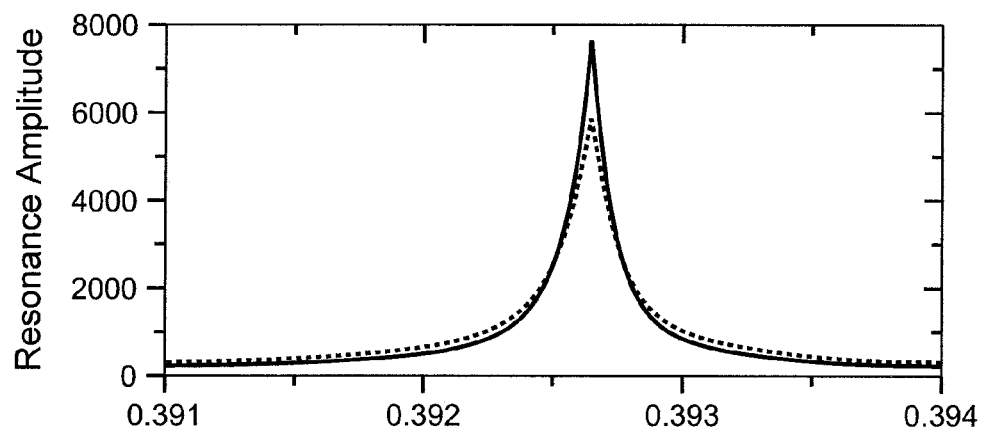
Figure 6B:
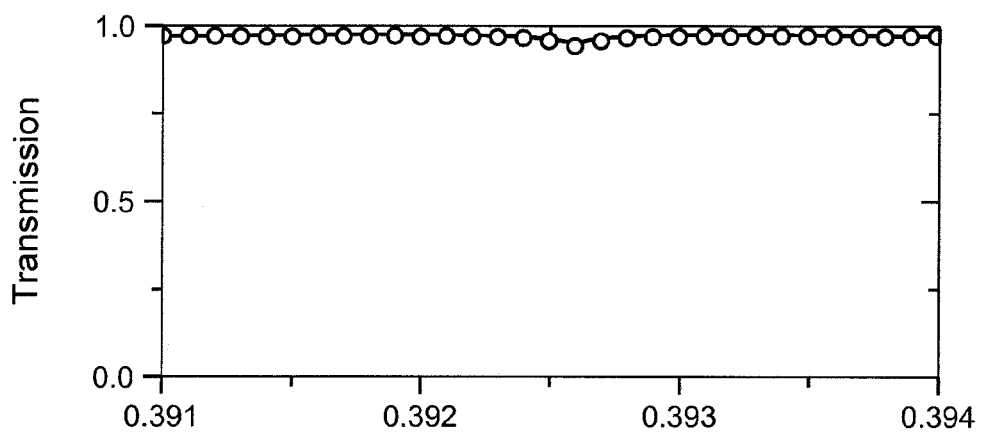
Figure 6C:
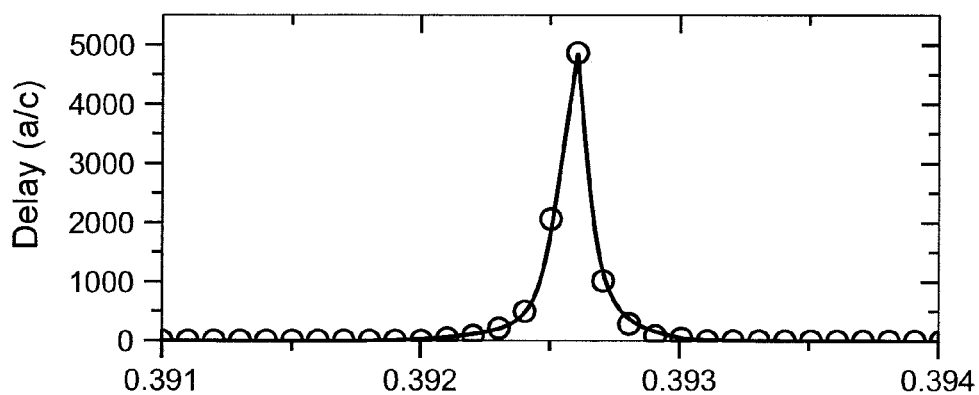

FIGS. 6(a)–6(c) illustrate spectral response functions for the one slab structure shown in FIG. 5(a) with a dielectric constant of 10.07. FIG. 6(a) is a graphical plot of the spectra of resonance amplitudes for the even mode (dashed line) and the odd mode (solid line). FIG. 6(b) is a graphical plot of the transmission spectrum for normally incident light. FIG. 6(c) is a graphical plot of the Group delay spectrum. In both FIGS. 6(b) and 6(c), the solid line represents the theory and the open circles correspond to FDTD simulations.

When the structure is chosen to have a thickness of 2.05 a where a is the lattice constant, a radius of air holes of 0.12 a, and a dielectric constant of 10.07, which corresponds to that of AlGaAs in optical frequencies (See E. D. Palik, *Handbook of Optical Constants of Solids* (Academic, San Diego, 1985), both the even and odd mode have the same frequency and widths as shown in FIG. 6(a). The transmission spectrum therefore shows near 100% transmission over the entire bandwidth both on and off resonance as can be seen in FIG. 6(b), while a large resonant delay is generated in the vicinity of the resonant frequency [FIG. 6(c)]. To compare the simulation results with the theoretical analysis, we extract the parameters from FIG. 6(a) and generate the theoretical spectra by using Eq. (11). We see excellent agreement between the simulation and the theory [FIGS. 6(b) and 6(c)]. The peak delay of 5000(a/c) corresponds to 10.14 ps, when the operating wavelength is at 1550 nm. For such a delay, the structure is only 1.2/an thick.

Figure 7:
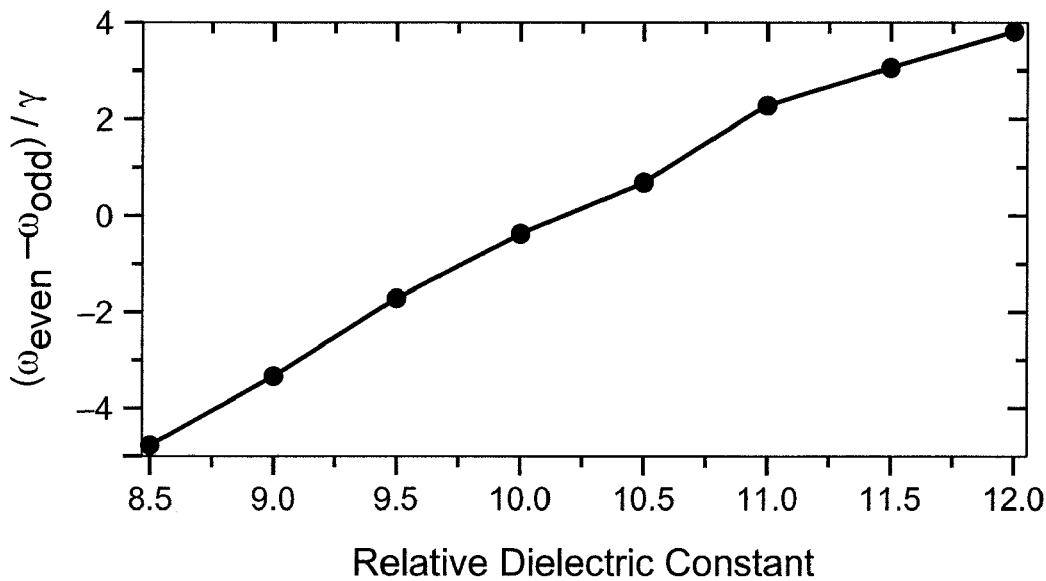
FIG. 7 is a graphical plot of the difference of the resonance frequencies for even and odd modes normalized by the decay rate as a function of the slab dielectric constant, for the structure shown in FIG. 5(a).

A flattop reflection filter can also be designed in a single photonic crystal slab, by choosing a different set of either structural or dielectric parameters. For simplicity, we fix the thickness and the radius of air holes, and vary only the dielectric constant. Our simulations show that the frequency of the even and odd mode varies with the dielectric constant in a different fashion, while the width of the resonance is largely insensitive to the dielectric constant as shown in FIG. 7, which is a graphical plot of the difference of the resonance frequencies for even and odd modes normalized by the decay rate as a function of the slab dielectric constant, for the structure shown in FIG. 5(a).

Figure 8:
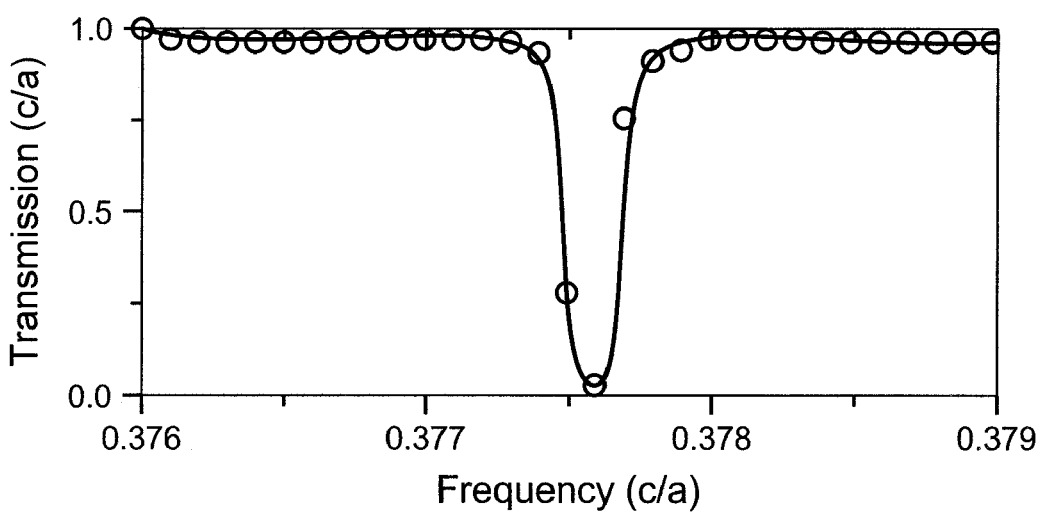
FIG. 8 is a graphical plot of the transmission spectrum for normally incident light upon the structure in FIG. 5(a), when the dielectric constant is 10.9. Solid line represents the theory and the open circles are FDTD simulations.

Therefore, by choosing the dielectric constant to 10.9 (which is still accomplishable using AlGaAs with a different aluminum content), we obtain the flattop behavior as seen in FIG. 8, which is a graphical plot of the transmission spectrum for normally incident light upon the structure in FIG. 5(a), when the dielectric constant is 10.9. Solid line represents the theory and the open circles are FDTD simulations. Again, the simulation shows excellent agreement with the theoretical prediction, generated using a similar procedure as outlined previously.

We note that the all-pass filter proposed here can be readily cascaded to create optical delay lines since the filter operates in a transmission mode (or a filter with the desired delay characteristics, such as which of the wavelength components that will be delayed relative to other wavelength components). In such an optical delay line, it has been shown that the maximum capacity is inversely related to the dimension of each stage. See Z. Wang and S. Fan, Phys. Rev.

E 68, 066616 (2003). Consequently, our filter structure, which is extremely compact, is useful for increasing the capacity of such delay lines. Also, unlike many single-mode integrated optical devices, both filter structures proposed here couple easily with optical fibers, since the mode of a fiber is typically far larger than the periodicity of the crystal. With a square lattice, at normal incidence the structure possesses a $C_{4v}$ symmetry. See D. Joyner, *Adventures in Group Theory* (The Johns Hopkins University Press, Baltimore, Md., 2002). Consequently the spectral functions are inherently polarization independent, which is required for most communication applications. Polarization-selective dispersion characteristics, on the other hand, can also be readily designed by simply choosing a crystal lattice with less symmetry. Finally, these structures are far more compact than conventional multilayer thin film devices commonly used, where the use of up to 100 dielectric layers is often required to accomplish a Q-factor of a few thousands with a desired line shape. We therefore expect these compact devices to be useful in optical communication systems.

Figure 9:
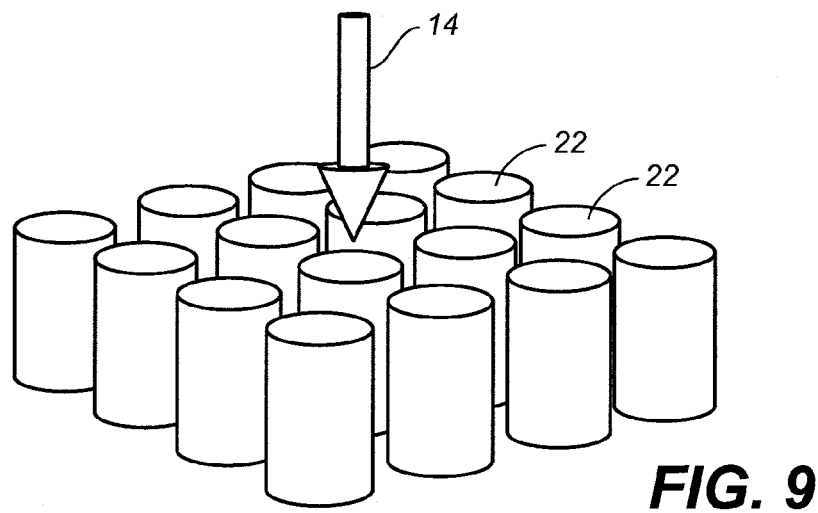
FIG. 9 is a schematic view of a two-dimensional array of dielectric rods to illustrate yet another alternative embodiment of the invention.

While the invention has been described above by reference to various embodiments, it will be understood that changes and modifications may be made without departing from the scope of the invention, which is to be defined only by the appended claims and their equivalents. For example, while the different embodiments described employ photonic crystals with two-dimensional array of holes therein, other types of dielectric structures with one or two-dimensional periodic contrast in index of refraction may be used instead, such as two-dimensional arrays of dielectric rods 22, as shown in FIG. 9, or one or two-dimensional gratings as shown in FIGS. 10(b) and 10(a). A two-dimensional array of dielectric rods or holes (FIGS. 9 and 5(a)) would have the same characteristics as a two-dimensional grating (FIG. 10(b)) for at least one polarization. All references referred to herein are incorporated by reference herein in their entireties, including Wonjoo Suh and Shanhui Fan, Appl. Phys. Lett. Vol. 84, No. 24, pp. 4905–4907 (14 Jun. 2004) and Wonjoo Suh and Shanhui Fan, Optics Lett. Vol. 28, No. 19, pp. 1763–1765 (Oct. 1, 2003).

What is claimed is:

1. A filter comprising a dielectric structure with periodic refractive index contrast therein, said structure having parameters such that at least two guided resonance modes exist in the structure when electromagnetic radiation is incident on the structure, wherein the at least two modes have substantially the same frequency and width but different symmetries, and wherein the filter exhibits substantially all-pass transmission characteristics over a bandwidth and introduces a delay of frequency components at or near a resonance frequency of the structure relative to other frequency components in the bandwidth.

2. The filter of claim 1, said structure comprising at least one photonic crystal body.

3. The filter of claim 1, said structure comprising a photonic crystal slab with a one or two-dimensional periodic array of holes therein, or a one or two-dimensional periodic array of rods of dielectric material.

4. The filter of claim 1, said structure comprising a one- or two-dimensional grating.

5. The filter of claim 1, said structure comprising two photonic crystal bodies, each of the at least two modes existing in one of the two bodies, the two bodies placed adjacent to each other at near field conditions so that the at least two modes are coupled to each other.

6. The filter of claim 5, further comprising a device that causes a distance between the two bodies to change.

7. The filter of claim 1, further comprising a component directing electromagnetic radiation to the structure.

8. The filter of claim 7, wherein the component directs the electromagnetic radiation to the structure in a direction about which the structure exhibits symmetry in periodic refractive index contrast, so that the filter is substantially polarization independent.

9. The filter of claim 7, said structure having a surface, wherein the component directs the electromagnetic radiation to the structure in a direction that is substantially normal to the surface of the structure.

10. An apparatus for filtering electromagnetic radiation comprising a plurality of dielectric structures with periodic refractive index contrast therein, each of said structures having parameters such that at least two guided resonance modes exist in the structure when electromagnetic radiation is passed through the structure, wherein the at least two modes have substantially the same frequency and width but different symmetries, and wherein each of said structures exhibits substantially all-pass transmission characteristics over a corresponding bandwidth and introduces a delay of frequency components at or near a resonance frequency of the corresponding one of the plurality of dielectric structure relative to other frequency components in its corresponding bandwidth wherein said plurality of dielectric structures are in a cascaded arrangement to receive electromagnetic radiation sequentially.

11. The apparatus of claim 10, wherein the resonance frequencies of at least two of the plurality of dielectric structures are different, so that frequency components at or near the resonance frequencies of the at least two dielectric structures are delayed relative to other frequency components in the corresponding bandwidth(s) of the at least two dielectric structures.

12. A filter comprising:

a dielectric structure with periodic refractive index contrast therein, said structure having parameters such that at least two guided resonance modes exist in the structure when electromagnetic radiation is incident on the structure, wherein the at least two modes have substantially the same frequency and width but different symmetries, and wherein the filter exhibits substantially all-pass transmission characteristics over a bandwidth and introduces a delay of frequency components at or near a resonance frequency of the structure relative to other frequency components in the bandwidth; and a component directing electromagnetic radiation to the structure.

13. The filter of claim 12, wherein the component directs the electromagnetic radiation to the structure in a direction about which the structure exhibits symmetry in periodic refractive index contrast, so that the filter is substantially polarization independent.

14. The filter of claim 12, said structure having a surface, wherein the component directs the electromagnetic radiation to the structure in a direction that is substantially normal to the surface of the structure.

15. The filter of claim 12, said structure comprising two photonic crystal bodies, each of the at least two modes existing in one of the two bodies, the two bodies placed adjacent to each other at near field conditions so that the at least two modes are coupled to each other, said filter further comprising a device that causes a distance between the two bodies to change.

16. A method for filtering electromagnetic radiation comprising:
providing a dielectric structure with periodic refractive index contrast therein, said structure having parameters such that at least two guided resonance modes exist in the structure when electromagnetic radiation is incident on the structure, wherein the at least two modes have substantially the same frequency and width but different symmetries, and wherein the filter exhibits substantially all-pass transmission characteristics over a bandwidth and introduces a delay of frequency components at or near a resonance frequency of the structure relative to other frequency components in the bandwidth; and
directing electromagnetic radiation to the structure.

17. The method of claim 16, wherein the directing directs the electromagnetic radiation to the structure in a direction about which the structure exhibits symmetry in periodic refractive index contrast, so that the filtering is substantially polarization independent.

18. The method of claim 16, said structure having a surface, wherein the directing directs the electromagnetic radiation to the structure in a direction that is substantially normal to the surface of the structure.

19. The method of claim 16, said structure comprising two photonic crystal bodies, each of the at least two modes existing in one of the two bodies, the two bodies placed adjacent to each other at near field conditions so that the at least two modes are coupled to each other, said method further comprising causing a distance between the two bodies to change.

20. A filter comprising a photonic crystal dielectric structure with periodic refractive index contrast therein, said structure having parameters such that at least two guided resonance modes exist in the structure when electromagnetic radiation is incident on the structure, wherein the at least two modes have substantially the same frequency, width and symmetry, and wherein the filter exhibits substantially flat top reflection characteristics at or near resonance frequencies of the structure over a bandwidth.

21. The filter of claim 20, said structure comprising at least one photonic crystal body.

22. The filter of claim 20, said body comprising a photonic crystal slab with an one or two-dimensional periodic array of holes therein, or an one or two-dimensional periodic array of rods of dielectric material.

23. The filter of claim 20, said structure comprising a one- or two-dimensional grating.

24. The filter of claim 20, said structure comprising two photonic crystal bodies, each of the at least two modes existing in one of the two bodies, the two bodies placed apart from each other so that the at least two modes are not substantially coupled to each other in near field.

25. The filter of claim 24, further comprising a device that causes a distance between the two bodies to change.

26. The filter of claim 20, further comprising a component directing electromagnetic radiation to the structure.

27. The filter of claim 26, wherein the component directs the electromagnetic radiation to the structure in a direction about which the structure exhibits symmetry in periodic refractive index contrast, so that the filter is substantially polarization independent.

28. The filter of claim 26, said structure having a surface, wherein the component directs the electromagnetic radiation to the structure in a direction that is substantially normal to the surface of the structure.

29. A filter comprising:
a dielectric photonic crystal structure with periodic refractive index contrast therein, said structure having parameters such that two guided resonance modes exist in the structure when electromagnetic radiation is incident on the structure, wherein the at least two modes have substantially the same frequency, width and symmetry, and wherein the filter exhibits substantially flat top reflection characteristics at or near resonance frequencies of the structure over a bandwidth; and
a component directing electromagnetic radiation to the structure.

30. The filter of claim 29, wherein the component directs the electromagnetic radiation to the structure in a direction about which the structure exhibits symmetry in periodic refractive index contrast, so that the filter is substantially polarization independent.

31. The filter of claim 29, said structure having a surface, wherein the component directs the electromagnetic radiation to the structure in a direction that is substantially normal to the surface of the structure.

32. The filter of claim 29, said structure comprising two photonic crystal bodies, each of the at least two modes existing in one of the two bodies, the two bodies placed so that the at least two modes are not substantially coupled to each other in near field.

33. A filter comprising a dielectric two-dimensional grating structure, said structure having parameters such that at least two guided resonance modes exist in the structure when electromagnetic radiation is incident on the structure, wherein the at least two modes have substantially the same frequency, width and symmetry, and wherein the filter exhibits substantially flat top reflection characteristics at or near resonance frequencies of the structure over a bandwidth.

34. The filter of claim 33, said grating structure comprising one or more bodies, wherein said at least two modes exist in a single integral body.

* * * * *